Patented Nov. 29, 1949

2,490,005

UNITED STATES PATENT OFFICE 2,490,005

PLASTICIZED LEATHERLIKE POLYESTER-POLYAMIDES AND PROCESS OF PRODUCING SAME

David W. Jayne, Jr., Old Greenwich, Harold M. Day, Cos Cob, and Edward L. Kropa, Old Greenwich, Conn., assignors to American Cyanamid Company, New York, N. Y., a corporation of Maine No Drawing. Application December 18, 1946, Serial No. 717,091

4 Claims. (Cl. 260—77)

This invention relates to high molecular weight polyester-polyamides and more specifically, to cross-linked polyester-polyamides.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound are described in the art as, for example, in Patent No. 2,363,581.

Linear polyamides of high molecular weight such as the well-known nylon are prepared from aminocarboxylic acids or from polyamines and dicarboxylic acids and are described, for example, in Patents Nos. 2,071,250, 2,130,523 and others.

Cross-linked polyester-polyamides are described and claimed in our copending applications, Serial Nos. 717,089 and 717,090 filed Dec. 18, 1946. These resinous products may be cured to strong, tough, leather-like materials by heating.

Attempts have been made to modify these leather-like polyester-polyamide products in order to lower their relatively high brittle points, a property which in many applications is most undesirable. We have found in the course of our investigation of products of this nature that external plasticizers such as the aromatic sulfonamides, tertiary butyl phenol, acetamide, stearamides, etc., added to the reaction mixture have substantially no effect on the brittle point of the resin and little or no general plasticizing action.

It is an object of the present invention to prepare a cross-linked polyester-polyamide of improved properties.

It is a further object of the present invention to prepare a high molecular weight cross-linked polyester-polyamide which is a plasticized, leather-like material.

Another object of the present invention is the preparation of a resinous product of low brittle point which can be readily drawn and calendered.

A further object of the present invention is the production of plasticized leather-like products having a brittle point of below about −20° C.

The above and other objects are attained by bringing about reaction between substantially equivalent proportions of a saturated aliphatic dicarboxylic acid which does not form an anhydride upon heating and an approximately equimolar mixture of a primary straight-chain monoalkylolamine and an ethylene glycol, and reacting the product obtained with a polyfunctional compound which is a polyhydric alcohol, a polyamine or an aliphatic amino alcohol in which the total number of hydroxyl groups, amino groups or hydroxyl and amino groups is at least 3, the molar ratio of acid to primary straight-chain monoalkylolamine to glycol to polyfunctional compound being from about 1:0.4:0.5:0.1 to 1:0.6:0.3:0.15. The product obtained is cured by heating.

The invention will be described in greater detail in conjunction with the following specific examples in which the proportions are given in parts by weight. It should be understood that the examples are merely illustrative and not intended to be restrictive of the scope of the invention.

Example 1

202 parts of sebacic acid (1.0 mol)
26 parts of monoethanolamine (0.4 mol)
29 parts of ethylene glycol (0.5 mol)
10 parts of diethanolamine (0.1 mol)

A mixture of the sebacic acid, monoethanolamine and ethylene glycol is heated at 200° C. for 3 hours while agitating with a stream of carbon dioxide. The diethanolamine is added and heating continued for 1 hour.

The viscous resin obtained is poured in a shallow tray and cured by heating in a vacuum oven at 160° C. for 12–16 hours. The cured resin sheet is tough, strong and leathery and has a brittle point of about −23° C. (−10° F.).

Example 2

202 parts of sebacic acid (1.0 mol)
30.5 parts of monoethanolamine (0.5 mol)
41.3 parts of diethylene glycol (0.39 mol)
10 parts of diethanolamine (0.1 mol)

The procedure of Example 1 is followed. A soft, pliable, leather-like material of good strength is obtained. It has a brittle point of below −30° C.

Example 3

303 parts of sebacic acid (1.5 mol)
52.2 parts of monoethanolamine (0.86 mol)
49.5 parts of diethylene glycol (0.46 mol)
15 parts of diethanolamine (0.15 mol)

The procedure of Example 1 is followed and a strong, tough, leathery product having a brittle point of −29° C. (−20° F.) is obtained.

Example 4

303 parts of sebacic acid (1.5 mols)
52.2 parts of monoethanolamine (0.86 mol)
49.5 parts of diethylene glycol (0.46 mol)
15 parts of diethanolamine (0.15 mol)

A mixture of the sebacic acid, monoethanolamine and diethylene glycol is charged into a vacuum-tight, electrically heated mixer fitted with sigma mixing blades and heated, with agitation, at 200° C. for 2 hours. The batch is then heated for an additional two hours under vacuum. The diethanolamine is added, and heating under vacuum is continued for another hour. The granular mass obtained can be readily molded under heat and pressure.

Saturated aliphatic dicarboxylic acids which may be used in the present invention are those which do not form an anhydride upon heating. Acids having at least four carbon atoms between the two carboxyl groups are preferred. Examples of suitable acids are adipic acid, azelaic acid, sebacic acid, pimelic acid, brassylic acid, suberic acid, etc.

In order to obtain a leathery product which can be calendered and/or cold-drawn, a primary straight-chain monoalkylolamine, for example monoethanolamine, mono-n-propanolamine, mono-n-butanolamine, etc., must be condensed with the saturated aliphatic dicarboxylic acid. Obviously, mixtures of two or more primary straight-chain monoalkylolamines may be used in place of any single alkylolamine of the type.

Ethylene glycols which we have found to exert a plasticizing effect on the leather-like products of the type described in our copending application referred to above and which therefore come within the scope of the present invention include ethylene glycol, diethylene glycol, and triethylene glycol.

Suitable polyfunctional compounds, i. e., those having at least three hydroxyl or amino or hydroxyl and amino groups, may be selected from the groups of aliphatic amino alcohols, polyhydric alcohols and aliphatic polyamines. Examples of some of these polyfunctional compounds are diethanolamine, the dipropanolamines, the dibutanolamines, hydroxyethylethylene diamine, trimethylol aminomethane, N-hydroxyethyl diethylenetriamine, diethylenetriamine, triethylenetetramine, tetraethylenepentamine, di-n-propylenetriamine, glycerol pentaerythritol, dipentaerythritol, etc.

The process of the present invention may be carried out at temperatures between about 180° and 220° C. and preferably at about 200° C. The reaction is advantageously carried out under reduced pressure, e. g. from about 1–10 mm. of mercury. The time of reaction will be dependent upon the pressure and will also vary in accordance with the particular reactants, the size of the batch, the heat transfer, etc. Generally under reduced pressures of from 1–10 mm. of mercury the reaction will require from about 6–8 hours while with higher pressures the time will be correspondingly longer. If the reactants be heated under atmospheric pressure for a time and then for an equivalent period under reduced pressures of from about 1–10 mm. of mercury, the total reaction time will be about doubled. If the entire reaction be carried out at atmospheric pressure, the reaction time will be about two to three times that when the entire reaction is carried out under reduced pressure.

It is preferable that the acid and alcohol-amine reactants be employed in approximately stoichiometrically equivalent proportions, but a slight excess of one of the reactants does not necessarily do any harm. In order to obtain products of the desired properties, however, it is essential that the proportions of reactants be carefully controlled. We have found that in order to obtain plasticized, leather-like products of the desired properties the molar ratio of the dicarboxylic acid to the monoalkylolamine plus ethylene glycol should be from about 1:0.9 to about 1:0.85, and the molar ratio of the dicarboxylic acid to the polyfunctional compound should be from about 1:0.1 to about 1:0.15. The molar proportions of monoalkylolamine to ethylene glycol should be from about 0.4:0.5 to 0.6:0.3.

The generally waxy product obtained upon reaction of saturated aliphatic dicarboxylic acid, alkylolamine, ethylene glycol and polyfunctional compound according to the process of the present invention is cured by heating. When the products are cured in the presence of air, surface oxidation apparently occurs and as a result the surface of the cured sheet becomes black and glossy. This black film is less elastic than the undersurface and accordingly, curing under vacuum is advisable. The curing temperature is not critical and may range from about 100°–200° C. We prefer a curing temperature of about 150° to about 180° C.

The leather-like products of the present invention can be cured in a granular form and they can be molded to obtain homogeneous leather-like articles. Molding may be carried out by injection or by compression. Moreover, molded sheets can be cold-calendered whereby the material is partially oriented to yield a hard leather-like substance which is especially useful as sole leather.

The products of the present invention may also be cured in sheet form and the resulting leather-like sheets can be cold-drawn or calendered.

In a semi-cured form the products may be used, for example, to impregnate paper, textiles, fibrous materials, etc.

The leather-like materials of the present invention have many uses as leather substitutes. Some of these include the fabrication of shoes, belts, aprons, gaskets, pump diaphragms, purses, wallets, traveling bags, seat coverings for vehicles, upholstery, shoe sole leather, etc. They can be cold-drawn into sheets, fibers, etc., molded into various shapes as bottle tops, containers, etc., and extruded as filaments, rods, tubes, etc. In general, they find application in many industrial fields including laminating, coating, impregnating, etc.

The resins of the present invention may be mixed with ester gum and various alkyd resins, particularly the oil-modified air-drying resins, to produce lacquers, varnishes, enamels, etc. They may also be incorporated with phenol-formaldehyde resins, urea-formaldehyde resins, thiourea-formaldehyde resins, melamine-formaldehyde resins and other amino-aldehyde resins, etc.

Obviously suitable fillers, dyes and pigments may be mixed with the resins to modify the properties thereof as may be desirable.

While we do not wish to be limited to any particular theory of mechanism of reaction, we believe that the saturated aliphatic dicarboxylic acid and the monoalkylolamine and ethylene glycol first react to form an alkylolamide, which amide self-esterifies to build up a linear polymer. The polyfunctional compound effects cross-linking of the linear polymers thus producing a flexible or elastic product which, however, has a high tensile strength.

The products of the present invention may vary rather widely in appearance but they have in common a definite, highly oriented crystalline structure, they may be cured by mere heating, and they may be cold-drawn and/or calendered.

We claim:

1. A leather-like product which is a polyester-polyamide obtained by heating sebacic acid, monoethanolamine and ethylene glycol in a molar ratio of from 1:0.4:0.5 to 1:0.6:0.3, heating the product obtained with diethanolamine, the molar ratio of sebacic acid to diethanolamine being from 1:0.1 to 1:0.15, and curing the reaction product obtained by heating.

2. A leather-like product which is a polyester-polyamide obtained by bringing about reaction between a primary straight-chain monoalkylolamine of the formula HO—Y—NH$_2$ in which Y is a divalent straight-chain unsaturated aliphatic hydrocarbon radical, a glycol of the group consisting of ethylene glycol, diethylene glycol and triethylene glycol and a saturated aliphatic hydrocarbon dicarboxylic acid which does not form an anhydride upon heating, bringing about reaction between the product so obtained and a polyfunctional compound selected from the group consisting of aliphatic hydrocarbon polyhydric alcohols containing at least three hydroxyl groups, aliphatic hydrocarbon polyamines containing at least three amino groups with a hydrogen atom attached to each amino nitrogen atom, and aliphatic hydrocarbon amino alcohols containing at least three hydroxyl groups and amino groups with a hydrogen atom attached to each amino nitrogen atom, the molar ratio of saturated acid to monoalkylolamine to glycol to polyfunctional compound being from 1:0.4:0.5:0.1 to 1:0.6:0.3:0.15, and curing the reaction product by heating.

3. A leather-like product which is a polyester-polyamide obtained by bringing about reaction between a primary straight-chain monoalkylolamine of the formula HO—Y—NH$_2$ in which Y is a divalent straight-chain unsaturated aliphatic hydrocarbon radical, a glycol of the group consisting of ethylene glycol, diethylene glycol and triethylene glycol, and a saturated aliphatic hydrocarbon dicarboxylic acid which does not form an anhydride upon heating, bringing about reaction between the product so obtained and an aliphatic hydrocarbon amino alcohol containing at least three hydroxyl groups and amino groups with a hydrogen atom attached to each amino nitrogen atom, the molar ratio of saturated acid to monoalkylolamine to glycol to amino alcohol being from 1:0.4:0.5:0.1 to 1:0.6:0.3:0.15 and curing the reaction product by heating.

4. A process of preparing a leather-like product which comprises bringing about reaction between a primary straight-chain monoalkylolamine of the formula HO—Y—NH$_2$ in which Y is a divalent straight-chain unsaturated aliphatic hydrocarbon radical, a glycol of the group consisting of ethylene glycol, diethylene glycol, and triethylene glycol and a saturated aliphatic hydrocarbon dicarboxylic acid which does not form an anhydride upon heating, bringing about reaction between the product so obtained and a polyfunctional compound selected from the group consisting of aliphatic hydrocarbon polyhydric alcohols containing at least three hydroxyl groups, aliphatic hydrocarbon polyamines containing at least three amino groups with a hydrogen atom attached to each of the nitrogen atoms, and aliphatic hydrocarbon amino alcohols containing at least three hydroxyl groups and amino groups with a hydrogen atom attached to each amino nitrogen atom, the molar ratio of dicarboxylic acid to monoalkylolamine to glycol to polyfunctional compound being from 1:0.4:0.5:0.1 to 1:0.6:0.3:0.15, and curing the reaction product obtained by heating.

DAVID W. JAYNE, JR.
HAROLD M. DAY.
EDWARD L. KROPA.

REFERENCES CITED

The following references are of record in the file of this patent:

UNITED STATES PATENTS

| Number | Name | Date |
|---|---|---|
| 2,333,639 | Christ et al. | Nov. 9, 1943 |
| 2,363,581 | Frosch | Nov. 28, 1944 |